United States Patent [19]

Metzdorff et al.

[11] Patent Number: 4,708,473
[45] Date of Patent: Nov. 24, 1987

[54] ACQUISITION OF RANGE IMAGES

[75] Inventors: Walter Metzdorff, Friedrichshafen; Peter Lux, Langenargen; Max Eibert, Friedrichshafen, all of Fed. Rep. of Germany

[73] Assignee: Dornier GmbH, Friedrichshafen, Fed. Rep. of Germany

[21] Appl. No.: 697,263

[22] Filed: Feb. 1, 1985

[30] Foreign Application Priority Data

Feb. 8, 1984 [DE] Fed. Rep. of Germany ....... 3404396

[51] Int. Cl.$^4$ ........................ G01C 3/08; G01B 11/24
[52] U.S. Cl. ....................................... 356/5; 356/375; 356/376; 356/4
[58] Field of Search .................. 356/5, 4, 2, 375, 376; 358/107

[56] References Cited

U.S. PATENT DOCUMENTS

| 3,866,052 | 2/1975 | Di Matteo et al. | 356/2 X |
| 3,951,549 | 4/1976 | Fowler et al. | 356/5 |
| 4,199,253 | 4/1980 | Ross | 356/5 |
| 4,443,705 | 4/1984 | Di Matteo et al. | 356/2 X |

Primary Examiner—L. T. Hix
Assistant Examiner—D. Rutledge
Attorney, Agent, or Firm—Ralf H. Siegemund

[57] ABSTRACT

Short light pulses are emitted and images of the reflection from objects are received; the receiving is timed and synchronized to obtain partial images corresponding to reflection from particular ranges; the partial images are then combined in a composite range image.

3 Claims, 4 Drawing Figures

ACQUISITION OF RANGE IMAGES

BACKGROUND OF THE INVENTION

The present invention relates to the acquisition of images representing ranges. Herein a range image is to be understood as a depiction of an object whose image points do not represent brightness values of emission or reflection and/or color of an individual point of the object, but the brightness represents the distance of the particular object point for example from the plane of the camera.

Methods are known for the two dimensional measurement and acquisition of range information i.e. distance information in the form of a range image as defined above; see for example P. Levi, Electronik 12, 1983. Generally speaking the known methods for acquiring range images can be divided into two groups which differ as to the physical measuring principle involved. In accordance with one method one determines range in terms of round trip travel time of electromagnetic or acoustic waves. In accordance with the other methods triangulation is involved. The first mentioned principle i.e. measuring travel time is suitable for distances larger than about 1 m up to infinity and, depending on the method involved, an accuracy of not less than 1 mm is attainable. The triangulation method is used primarily in the close up range i.e. under 1 m distance primarily for reasons of relationship between the measuring base line and the accuracy involved in triangulation.

The known methods as far as travel time measurements are concerned are disadvantaged by the fact that generally speaking one measures the distance between a particular point and a sensor. An image is now produced by means of a beam deviation for example under utilization of a rotating or oscillating mirror. In this case one acquires basically on a scanning basis measure point distance after the one. Such a system is basically mechanical and is quite expensive as far as optics is concerned.

Systems operating on the basis of triangulation permit under certain conditions that several object points are measured simultaneously if more than one line is envisageol. The system is disadvantaged by the fact that the acquired information is not unambiguous which means that the image evaluation becomes expensive. Moreover the method is clearly limited to the close up range.

DESCRIPTION OF THE INVENTION

It is an object of the present invention to provide a new and improved method and equipment for acquiring range images which is applicable and usable over a large distance range and does not require complex mechanical structures and involves inherently a method by means of which unambiguous images can be acquired in a rather fast manner.

In accordance with the preferred embodiment of the present invention it is suggested to transmit light pulses towards a target area preferably under conditions establishing a well defined field of view; these pulses will be reflected by any object within that field of view and the reflected pulses will be received for example by a video camera diode array charge coupled device or charge injection device through appropriate control particularly as far as timing in relation to the transmission of an individual light pulse is concerned. The actual receiving of imaging reflection is limited such that for each such light pulse as transmitted and reflected a partial image is produced wherein the image points are generated by reflections occuring within a limited and well defined time interval or several particularly timed time intervals. Such partial image therefore represents the distance of certain object points from the camera and within a particular interval by proper processing these several partial images each covering a different distance range will be superimposed to obtain a composite range image.

The inventive equipment, basically, is comprised of four groups or subsystems:

(a) A device for the transmission of short light pulses.

(b) A device for receiving pulses as they have been reflected from an object.

(c) A control unit.

(d) A processing and evaluating stage.

The light pulses necessary for the illumination of the object may in a preferred mode be produced by a pulsating laser. It is also possible to use other light sources such as a continuous wave light source. In such a case one will produce the pulses through an electro-optical shutter such as a KERR cell or a POCKELS cell which operates sufficiently fast. The thus produced beam is passed through an optic in order to enlarge the illuminating field. The size of the produced illumination field depends upon the application. In case of a distance sensor on a machine or the like or operating in conjunction with a robot, the requisite area or field is a few square cm. In the case of a system for acquiring aerial pictures of the ground using airborn vehicle, the illuminated area must cover several hundred square meters or even more. The choice of equipment and parameters depends to a considerable extent on the desired resolution. One will also select the appropriate wavelength in accordance with the task at hand. In a basically dark area of a machine tool one may use a broad band radiation source. In the case of areal pictures it is however of advantage to use a very narrow band light source including radiation in the infrared or the ultraviolet range. This particular feature for that application is desirable in order to eliminate stray lights from parasitic light sources under utilization of the appropriate narrow band pass range filters in the acquisition unit. The pulses reflected from the object may be acquired directly by means of a television camera provided the intensity of the reflected pulses is sufficient. In the case the reflection for example is very low an image amplifier may have to be interposed.

In accordance with another feature of the invention the receiving unit includes a fast operating shutter which is preferably operating on electrooptical principles. The shutter is opperated in synchronism with the emission of light pulses and by means of the control unit mentioned above. The shutter may be delayedly opened and reclosed. If the time delay is equal to the round trip travel time of light, i.e. the time the light requires to travel from the transmitting source to the object and back to the camera then the emitted pulse will reach the camera through the opened shutter. The duration of the shutter operation permits variation in the range within which the reflected light energy is measured particularly as to arrival time. The shorter the period of time the shutter is open the smaller is the distance range covered by the system for the acquisition of distance information. For example, if one opens the shutter 400 ns after the laser pulse has been emitted and for just 2 ns one will in fact acquire distance information covering range between 60 m and 60.3 m. In other words radiation received by the sensor will have been reflected by objects or portions thereof being spaced between 60 and 60.3 m from the sensor-light source system. The resulting points will be imaged in 2 dimensions on the image receiving surface of the camera. The image amplifier that may be interposed will amplify any weak reflected signal and pass it on to the processing unit.

A Vidicon tube or a charge coupled device (CCD) or a charge injection device (CID) may be used in lieu of a regular TV camera for the acquisition of image information. Also in lieu of an electrooptical shutter and of a conventional image amplifier one may use a microchannel plate. In this case one has to consider that the shutter operation corresponds to the runup of the amplification factor simply through the application of a voltage to such a plate. Analogously it is possible to use a fast switchable image amplifier. In order to acquire the image information proper one may provide a switchable diode array behind the receiving optics. The image then is directly available as a matrix of electrically or electronically encoded signals which can be called up or used directly. A diode array is also usable for operating modes such as integration and storage of the image information. It can thus be seen that the system distinguishes between a shutter function for restricting the time interval for receiving reflected light pulses; a signal amplification function and an image receiving function. These functions can be structurally realized in composite fashion.

In the following several modes of operation will be described which however are all variants of a certain basic method. In each instance individual images will be acquired covering particular distance range and the control opens and closes the shutter of the receiving unit in a particular timed relation to the emission of illuminating pulses. The individual sequentially produced images will then be processed in the evaluating unit in that that unit combines individual images to a composite range image. The processing may use and employ digitilization and encoding of the measured distances for example in terms of distance vs. gray scale units following which the respective individual signal values are stored. Weak noise signals may be suppressed through threshold processing and appropriate circuitry.

Following this basic method one will acquire at first individual images within a relatively small distance range. The image points of such a particular partial image will receive a certain gray value. The various images sequentially acquired differ as to the relevant distance range. As far as distance vs. gray value relation is concerned, one may for example use a bright gray value for close objects while the gray value darkens stepwise as the distance range is shifted towards greater distances. Each individual image being related to a particular distance range is therefore characterized by image points having a particular gray value or contrasting for example with completely black or white image information. These individual images are then combined to a composite image. If one desires for example to have a range image of the type just mentioned at a spatial resolution of about 30 cm in terms of distances, one needs a number of illuminating pulses and the ranges are delayed in steps by increments of 2 ns. In other words for sequential light pulses, the shutter opening is delayed from the time of transmission by a period equal to the delay used for the preceding pulse plus the period the shutter is held open. Thus, step by step one shifts the acquired range from close distances to larger distances. The thus acquired information is then combined in the processing and evaluating unit to obtain a composite range image.

Assuming by way of example that one wants to acquire elevational differences in a topographic photograph at an areal (depth) resolution of about 30 cm and covering a total distances range from 76.8 m; one needs about 256 image pulses i.e. one will create 256 partial images each having validity within a certain very small range and the evaluating unit will then combine these 256 images.

In accordance with the second method following still the same basic principle outlined above one can reduce the number of illumination pulses to a considerable degree. If in the method as described n illumination pulses are needed one will be able to reduce this to a number that is the logarithm to the base of 2 of the number n. Specifically, in the case n is 256 the reduction is down to 8. This means that one can operate the method even in a real time environment.

This second method does not use completely separate distance ranges. Instead the shutter times of the receiver are controlled through rectangular pulses such that distances can be encoded on the basis of a binary scale. In a single image one will in fact combine overlapping distance ranges. In a first image all objects in the first half of the desired total range are acquired; in a second image one will receive reflections from objects in the first quarter of the distance range as well as in the third quarter of the desired range. In the third image all objects in the first, third, fifth, and seventh eighth of the total distance range are combined. In a fourth image all objects of the third, fifth, seventh, ninth, eleventh, thirteenth, and fifteenth, sixteenth are combined. This procedure is continued until one has reached the desired resolution. The images are advantageously immediately available in digital format. Each image point is represented by a digital number having as many digits as images have been made in total. This procedure facilitates further processing to a considerable extent.

By way of example if we consider a particular image point and that point has received the reflection of an object which in fact is situated between 11/16 and 12/16 of the total range then the particular image point is digitally represented by the numbers 0100. This number represents the following. The first "zero" is indicative that this object point is not in the first half of the total distance range. The "one" indicates that the object is within the ¾ of the total image range and the other two zeroes represent that the object is not within an odd numbered eighth of the image range and that the object is also not in an odd numbered sixteenth of the range. The number 0100 thus defines the actual distance of the object quite adequately. The method requires that the shutter opening time is halved in sequential pictures. This mode of operation is basically arbitrary. One can use other fractions but it can be seen that the halving of the shutter opening time period in sequential images furnishes immediately and directly a binary number which is quite advantageous for immediate electronic processing.

The number of the individual images produced by this method depends on the desired resolution and is also dependent on whatever expenditure one wishes to make. An alternative limiting parameter is simply the total time of acquisition. For acquiring the highest resolution image the shutter is opened at the highest frequency and one needs relatively expensive equipment operating in the gigahertz range. It is however possible to obtain the same resolution by using half of that frequency but in the last step the same frequency as in the next to the last is used but one provides a phase shift of the control. The resulting binary numbers will again describe the object point rather unambiguously.

In accordance with a third method still following the basic principles outlined above, the individual or partial images are acquired as to different distance ranges in the sense that reflections are received from object parts being closer than a particular distance value R. This value R is then increase in steps for sequential partial images but all image points in each individual or partial image will be associated with the same brightness. One can obtain this particular aspect through operation of the image amplifier when operating in the saturating range. One will use then a storage array and the individual or partial images are sequentially inputed into that array whereby the brightness value of the respective next image is added to the one that may already be in the particular array point. A closely positioned object for example in the case of areal pictures the top of a tower will be reproduced and represented by a very bright image because it is simply found in many individual or partial images.

There is still another method following the basic principle of the invention outlined above which can be used if a sensor and the object to be acquired move in a translatory relative fashion in relation to each other. This is for example the case if objects on a movable conveyor belt are to be tracked. The sensor will be at rest while the object or objects move. The same situation prevails in principle if conversely the sensor or image acquiring unit is situated on a vehicle or in a plane; the object is still moving in relation thereto. Dynamically these two cases do not have to be distinguished. In this case then the following principle applies.

The sensor is adjusted so that the source as well as the image field or field of view of the acquiring camera or the like is oriented directly towards the front or in an oblique fashion. The angle relation to the normal on the image field will determine essentially the range acquired as well as the resolution. Transmission of light pulse and the electrooptically operated shutter of the camera are now synchronized in such a manner that the target of the camera is illuminated only if there is an object or a portion of an object within the illuminated field which is closer than a particular distance R from the camera. Reflections arriving from a distance larger than R will be blocked by the shutter which is closed at the appropriate instant. Reflection points which are spaced from this value R at exactly that distance within a certain tolerance transitions from bright to dark i.e. illuminated to unilluminated areas obtain. These transitions correspond in fact to the measuring value R. If the object and the camera move in relation with each other in accordance with particular direction one will simply acquire new points. As the object, relatively speaking, passes through the illumination cone one acquires in fact all object points because they must pass at some point or another through that range R. It is necessary to know exactly the relative speed between object and camera and illumination source and now it is possible to calculate the distance. Elevational levels could be recalculated through a simple geometric process. In order to reduce the parasitic effect of stray light and interfering light sources the shutter should be synchronized (held closed) so that not all light be reflected closer than the critical distance R is being acquired but only from within a particular tolerance range.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings, FIG. 1 illustrates a particular system in which a first subsystem is comprised of a timer or a pulse generator 1, a laser 2, and an illuminating optic 3 for widening the image and illumination field. This unit is provided therefore generally for the transmission of short light pulses. One may use in lieu of the laser 2 a different kind of light source cooperating with a shutter in order to generate a sequence of light and illuminating pulses.

Figure 1:
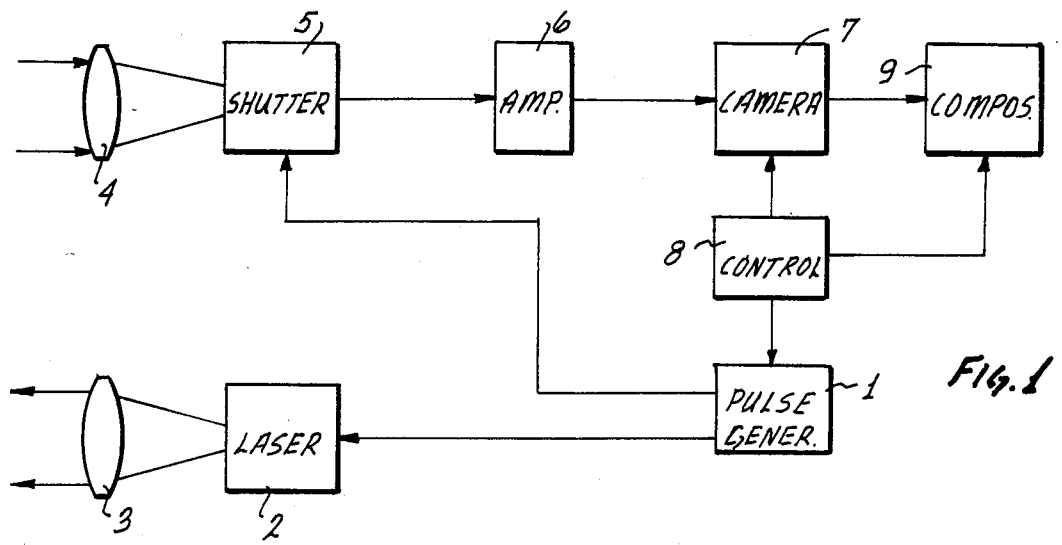
FIG. 1 is a block diagram of a device in accordance with the preferred embodiment of the present invention for practicing the best mode thereof.

The second subunit is provided for the receiving of reflected pulses from an object. They include an imaging optic 4, an electrooptical shutter 5, an image amplifier 6, and a TV camera 7. As was outlined above in lieu of the TV camera 7 one may use VIDICON device, a CCD, a CID, or a diode array. Within the enumeration of subsystems outlined above there is a third subsystem which is basically comprised of the control unit 8 which as illustrated controls basically the camera 7 on one hand and the pulse generator 1 on the other hand particularly as far as timing and/or enabling is concerned. Also it can be seen that the pulse generator does not only operate the laser or other light source but also the electrooptical shutter 5 of the receiving unit. This link establishes the synchronization between shutter and light transmission. The final subsystem includes a processing and evaluating stage 9 which is also controlled by the control unit 8 but receives all its data from the image acquisition unit 7. The stage 9 electronically composes the complete range image. The image receiving device 7 in a general sense may include threshold structures such that for example spurious light and image points be suppressed as noise. Also the camera or light receiving device may in dependence upon the particular evaluating method employed (see discussion below) merely register light or no light conditions adequate gray scale values for example will then result from the processing and combining operation.

Generally speaking the control unit 8 and timer 1 provide for a predetermined relationship between the production of the laser pulse emitted by the transmitting unit and the time of opening the shutter 5. This means that the conttol unit 8 in effect adjusts the system to a particular range. The time of opening the shutter basically determines that a pulse must arrive at the receiving unit not earlier than the particular time of opening the shutter vis-a-vis the emission of the light pulse. This means that the object from which a reflection occurs must not be closer than the particular distance which in terms of transit time corresponds to the delay between the emission of the light pulse and the opening of the shutter. Analogously the time of closing the shutter determines that pulses which require longer for their return i.e. are reflected correspondingly by farther away objects will in return find the shutter closed. The time spacing between shutter opening and shutter closing determines the particular distance range from which reflections are acquired in a particular partial image. An object must be within that particular distance if a reflection is to be received by the imaging unit 7.

It can be seen that a simple method of practicing the invention may be comprised of running the times of opening and closing the shutter through the following sequence. One begins with the acquisition of a partial image e.g. in which the light pulses received are within a range R and R' wherein R and R' differ by a particular tolerance value. The shutter 5 opens when light that was reflected by an object of the distance larger than R will arrive but the shutter will close when light arrives from an object that is farther than R'. This produces a first image which is acquired by the camera 7 and after appropriate processing stored in the unit 9 as a first partial image. When the next light pulse emitted by the transmitter unit 1-2-3 is received, the shutter opens corresponding to a delayed time for the distance R' and closes for a distance R". This produces another partial image. The third image is produced by opening the shutter corresponding to a distance of reflection of R" and closing the shutter by R'''. Possibly the distances R, R', R" etc. are equidistantly spaced i.e. the space differential is equal but this is not necessary in principle. One may use an increase in spacing and approximate this way large distances in a finite procedure of increasing steps.

Figure 2:
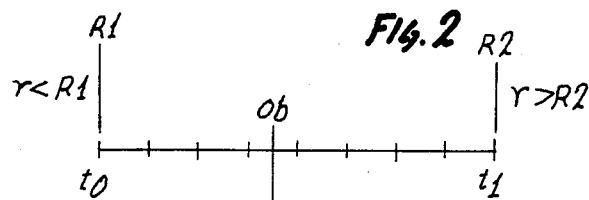
FIG. 2 and 3 are pulse diagrams illustrating process steps in the evaluation and image acquisition, in representation of two different methods using equipment shown in FIG. 1.
Figure 3:
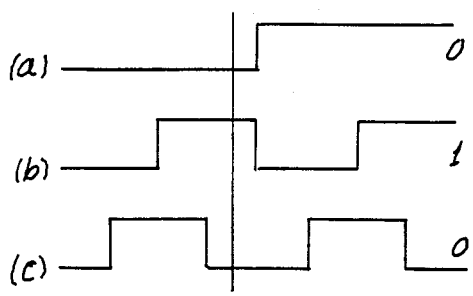

FIG. 2 shows a pulse and signal diagram for practicing the second method as outlined above wherein an image range is encoded in a binary fashion. The distance range $R_1$, $R_2$ is represented here through pulse round-trip travel time ranges between $t_0$ and $t_1$; distances $r < R_1$ and $r > R_2$ are disregarded. The desired resolution is assumed to be ⅛ of the total range. The object OB may be situated within the 4/8 of the range. Line a in FIG. 2 illustrates a rectangular pulse which opens the shutter 5 for a first image (signal level high for opening) and closes for low signal level. Specifically, the shutter is opened for the second half of the total range. The object point OB is not imaged as such because it is in the first half of the distance range. The partial image receives a digital code value of 0 as to that image point because the object point is closer than the second half of the image range. Line b in FIG. 3 illustrates a rectangular pulse for the second image as it opens and closes the shutter. It can readily be seen that the shutter is in this sequence opened once, closed again, and opened again. In particular the shutter is opened during the second quarter of the travel time and distance range during the last quarter of that range. The object point now is imaged as a result of the first one of the pulses because this pulse is received as a reflection by the object OB. Therefore this particular partial image is now encoded as to the particular point with a digital value 1.

Line c in FIG. 2 illustrates the next set of pulses which are pulses for the second, fourth, sixth, and eighth internal and distance range. Again the object will be imaged in this case by the second one of the pulses so that again that particular image receives a digital value 1. Taking the three images together one can see that that particular object point is encoded by 011 corresponding to the three images which encoding determines that the object is situated in the 4/8 of the range.

FIG. 3 illustrates a binary encoding corresponding to FIG. 2 but with the added advantage that the same resolution i.e. ⅛ of the range is realizable with a slightly more sluggishly operating shutter. Lines a and b represent the same opening and signals for the shutter 5 as shown in lines a and b of FIG. 2. Line c of FIG. 3 shows a different pulse sequence for producing the third image. The pulse rate frequency is the same as for line b but the frequency is not increased as it was the case if one compares line b and c of FIG. 2. The signals for line c in FIG. 3 are merely phase shifted by ½ the pulse distance value and pulse length value which is ¼ or 90 degrees of the pulse rate frequency again one obtains a binary encoding but for this mode of operating the object point is represented by the number 010 using this particular method one obtains also unambiguously that the object OB is situated in the 4/8 of the total range. The method of FIG. 3 has the advantage that one can use a lower frequency for the highest resolution situation.

Figure 4:
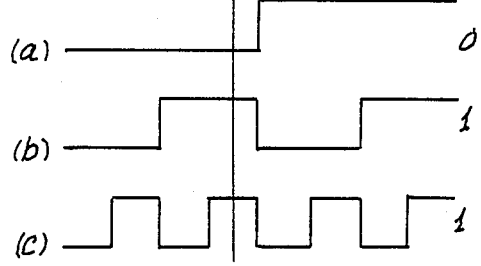
FIG. 4 illustrates another range image acquisition evaluating method, still using equipment as illustrated in FIG. 1.
Figure 4:
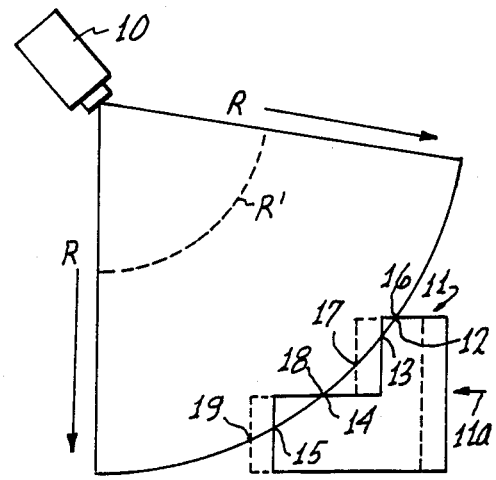

Proceeding now to the description of FIG. 4, the figure illustrates an evaluating method for a moving object 11 i.e. the object 11 is assumed to move in the direction of the arrow 11a under the camera 10 and through a particular range which is defined by a field of view cone and radius R. The equipment 10 is basically the same as shown in FIG. 1. The transmitted pulse and the electrooptical shutter of the camera are now synchronized such that the target of the camera is illuminated only if the object and the portion of the object is closer than the distance R in front of the camera. Reflections originating from a distance larger than R will be blocked by the closed shutter. The shutter on the other hand is opened shortly after the pulses have emitted but there may be the requirement that the distance must be such that the object will under no circumstances come any closer to the camera and the transmitter than that distance R'.

FIG. 4 illustrates the instance in which points 12,13,14,15 of the irregularly shaped object 11 have exactly the distance R from the camera. Therefore in these points transitions are produced from bright to dark areas as far as the resulting image is concerned. These transitions are exactly indicative of a reflection distance R. If the object is moved in the direction of the arrow then in a subsequent instance it will have a position as indicated by the dotted line in the figure. New reflection points 16,17,18,19b have exactly the same distance R from the camera and in this second image they will produce the stated transition from bright to dark.

The invention is not limited to the embodiments described above but all changes and modifications thereof not constituting departures from the spirit and scope of the invention are intended to be included.

We claim:

1. Method for generating range images comprising the steps of, generating a plurality of partial range images by means of transmitting short light pulses and receiving reflections arriving within particular periods of time only, including, producing each of said partial images with a different gray value; and composing a composite range image from said partial images by combining different gray values of the different partial images.

2. Method for generating range images comprising the step of generating a plurality of partial range images by means of transmitting short light pulses and receiving reflections arriving within particular periods of time only including providing each said partial image with the same gray value; and composing a composite range image from said partial images the composite image being produced through adding of different values of brightness to the partial images.

3. Method for generating range images of moving objects comprising the step of generating a plurality of partial range images by means of transmitting short light pulses and receiving reflections arriving within particular periods of time only; said partial images each involve the same distance range of the moving object as moving; and composing a composite range image from said partial images the composite picture resulting from evaluating brightness differences of sequentially produced partial images.

* * * * *